United States Patent
Ukai et al.

(10) Patent No.: US 12,459,060 B2
(45) Date of Patent: Nov. 4, 2025

(54) SOLDER PASTE

(71) Applicant: SENJU METAL INDUSTRY CO., LTD., Tokyo (JP)

(72) Inventors: Ryuji Ukai, Tokyo (JP); Kengo Ohta, Tokyo (JP); Sakie Okada, Tokyo (JP); Kazuya Kitazawa, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 52 days.

(21) Appl. No.: 17/641,012

(22) PCT Filed: Aug. 28, 2020

(86) PCT No.: PCT/JP2020/032633
§ 371 (c)(1),
(2) Date: Mar. 7, 2022

(87) PCT Pub. No.: WO2021/065271
PCT Pub. Date: Apr. 8, 2021

(65) Prior Publication Data
US 2022/0331916 A1 Oct. 20, 2022

(30) Foreign Application Priority Data
Oct. 4, 2019 (JP) .................................. 2019-183500

(51) Int. Cl.
| | | |
|---|---|---|
| B23K 35/362 | (2006.01) | |
| B23K 35/02 | (2006.01) | |
| B23K 35/36 | (2006.01) | |

(52) U.S. Cl.
CPC .......... *B23K 35/362* (2013.01); *B23K 35/025* (2013.01); *B23K 35/3601* (2013.01)

(58) Field of Classification Search
CPC .... B23K 35/362; B23K 35/025; B23K 35/36; B23K 35/3612; B23K 35/3613; B23K 35/3618; B23K 35/22; B23K 35/222; B23K 35/224; B23K 35/226; B23K 35/228; B23K 35/24; B23K 35/26; B23K 35/262; B23K 35/264; B23K 35/266; B23K 35/268; B23K 35/28; B23K 35/282; B23K 35/284; B23K 35/286; B23K 35/288; B23K 35/30; B23K 35/3006; B23K 35/3013; B23K 35/302; B23K 35/3026; B23K 35/3033; B23K 35/304; B23K 35/3046; B23K 35/3053; B23K 35/306; B23K 35/3066; B23K 35/3073; B23K 35/308; B23K 35/3086; B23K 35/3093; B23K 35/32; B23K 35/322; B23K 35/325; B23K 35/327
See application file for complete search history.

(56) References Cited

U.S. PATENT DOCUMENTS

| | | | | |
|---|---|---|---|---|
| 4,460,414 A | * | 7/1984 | Hwang | ............... B23K 35/3613 148/26 |
| 2003/0047034 A1 | * | 3/2003 | Ono | ................... B23K 35/0244 75/331 |
| 2004/0250919 A1 | * | 12/2004 | Saito | ..................... B23K 35/362 148/25 |
| 2008/0073414 A1 | | 3/2008 | Saito et al. | |
| 2009/0236404 A1 | | 9/2009 | Yamakawa et al. | |
| 2013/0042946 A1 | | 2/2013 | Yang et al. | |
| 2013/0082089 A1 | | 4/2013 | Gallagher et al. | |
| 2013/0082092 A1 | * | 4/2013 | Dhoble | ................. B23K 35/362 228/180.1 |
| 2016/0221128 A1 | | 8/2016 | Kojima et al. | |

FOREIGN PATENT DOCUMENTS

| | | | | |
|---|---|---|---|---|
| CN | 103042320 A | | 4/2013 | |
| CN | 105531076 A | | 4/2016 | |
| CN | 106392378 A | * | 2/2017 | ......... B23K 35/3612 |
| CN | 106607650 A | | 5/2017 | |
| CN | 108687464 A | | 10/2018 | |
| EP | 3040154 A1 | | 7/2016 | |
| GB | 2110249 A | * | 6/1983 | ......... B23K 35/3603 |
| JP | 05069188 A | | 3/1993 | |
| JP | 05228690 A | | 9/1993 | |
| JP | 10109188 A | | 4/1998 | |
| JP | 10128573 A | | 5/1998 | |
| JP | 2013082004 A | * | 5/2013 | |
| JP | 2013515611 A | | 5/2013 | |
| JP | 6332526 B1 | | 12/2018 | |
| JP | 2018196900 A | | 12/2018 | |
| TW | 228132 B | | 2/2005 | |

(Continued)

OTHER PUBLICATIONS

Machine translation of JP 6332526 B1 to Kawasaki et al., original document published May 11, 2018.(Year: 2018).*
J(ue)rgen Pionteck and George Wypych, eds., Handbook of Antistatics, 2nd ed., ChemTec Publishing, 2016, p. 32 (Polyethylene Glycol). (Year: 2016).*
International Search Report mailed Nov. 2, 2020 for the corresponding PCT International Application No. PCT/JP2020/032633, 7 pages including English machine translation.
Written Opinion mailed Nov. 2, 2020 for the corresponding PCT International Application No. PCT/JP2020/032633, 3 pages.
International Preliminary Report on Patentability mailed Feb. 22, 2021 for the corresponding PCT International Application No. PCT/JP2020/032633, 6 pages including English machine translation.

(Continued)

*Primary Examiner* — Vanessa T. Luk
(74) *Attorney, Agent, or Firm* — Leason Ellis LLP; Melvin C. Garner; Mitsuhiro Haraguchi

(57) ABSTRACT

A solder paste includes a solder powder and a flux. The flux includes a rosin, an activator, a solvent, and a thixotropic agent containing a polyethylene glycol. A content of the polyethylene glycol is 10 mass % to 20 mass % with respect to a total mass of the flux, a content of the thixotropic agent excluding the polyethylene glycol is 5 mass % or less with respect to the total mass of the flux, and a content of the rosin is more than 15 mass % and 50 mass % or less with respect to the total mass of the flux.

7 Claims, No Drawings

(56) References Cited

FOREIGN PATENT DOCUMENTS

| TW | 201607992 A | 3/2016 |
|----|-------------|--------|
| TW | 201908365 A | 3/2019 |
| WO | 2007034758 A1 | 3/2007 |
| WO | 2015037107 A1 | 3/2015 |

OTHER PUBLICATIONS

Taiwanese Office Action mailed Aug. 5, 2021 for the corresponding Taiwanese Patent Application No. 109132678, 8 pages including English translation.
Japanese Office Action mailed Mar. 17, 2020 for the corresponding Japanese Patent Application No. 2019-183500, 9 pages including English machine translation.
Chinese Office Action mailed Jul. 26, 2022 for the corresponding Chinese Patent Application No. 202080069170.9 (14 pages including English translation).
Korean Office Action mailed Sep. 2, 2022 for the corresponding Korean Patent Application No. 10-2022-7009627 ( 7 pages including English translation).
Extended European Search Report mailed Oct. 19, 2022 for the corresponding European Patent Application No. 20870464.3 (7 pages).

* cited by examiner

SOLDER PASTE

CROSS-REFERENCE TO RELATED PATENT APPLICATIONS

This application is a U.S. National Phase Application under 35 U.S.C. § 371 of International Patent Application No. PCT/JP2020/032633 filed on Aug. 28, 2020 and claims the benefit of priority to Japanese Patent Applications No. 2019-183500 filed on Oct. 4, 2019, the contents of all of which are incorporated herein by reference in their entireties. The International Application was published in Japanese on Apr. 8, 2021 as International Publication No. WO/2021/065271 under PCT Article 21(2).

FIELD OF THE INVENTION

The present invention relates to a flux which is prevented from being burned after heating and is prevented from separating from a powder, and a solder paste.

BACKGROUND OF THE INVENTION

A solder paste is made of a flux and a solder powder. An electrode pad is provided on a substrate on which electronic components are mounted. The solder paste is printed on the electrode pad, and a solder joint is formed by a reflow treatment. The printing of the solder paste is performed by placing a metal mask with openings on the substrate, moving a squeegee while pressing the squeegee against the metal mask, and applying the solder paste all at once from the openings of the metal mask to the electrode pad on the substrate.

In recent years, as miniaturization of the electronic components progresses, the electrode pad becomes smaller, and a time needed to use up a purchased solder paste becomes longer. When a storage period is long, initial printing performances of the solder paste after purchase may not be exhibited depending on storage conditions, e.g. viscosity of the solder paste may increase and the solder paste may not be applied from the openings of the metal mask. In addition, since the electrode pad becomes small and a printing area becomes small, a particle diameter of the solder powder to be used for the solder paste must be reduced. For this reason, a surface area of the solder powder becomes large, and thus a surface of the solder powder may be oxidized, and the solder paste may deteriorate over time.

Therefore, for example, JP H05-228690 A, JP H10-109188 A and JP H10-128573 A disclose a flux containing 7 weight % or less of a polyethylene glycol (hereinafter, appropriately referred to as "PEG"), such that increase in viscosity of the solder paste due to formation of complexes by elements constituting the solder powder and a rosin in the flux is prevented, and the printing performances and storage stability are improved.

CITATION LIST

Patent Literature

Patent Literature 1: JP H05-228690 A
Patent Literature 2: JP H10-109188 A
Patent Literature 3: JP H10-128573 A

Technical Problem

In the inventions described in JP H05-228690 A, JP H10-109188 A and JP H10-128573 A, a predetermined amount of a PEG is contained in order to reduce the increase in viscosity of the solder paste, but JP H05-228690 A discloses that when the PEG is contained in an amount of more than 7 mass %, a slump property thereof decreases. JP H10-109188 A discloses that when the PEG is contained in an amount of more than 3 mass %, not only a risk of migration increases due to hydrophilicity of the flux itself, but also activity of solder metal particles is hindered due to overprotection of the solder metal particles and generation of solder balls increases. JP H10-128573 A discloses that when the PEG is contained in an amount of 2 mass % or more, generation of solder balls increases. Therefore, in the inventions described in JP H05-228690 A, JP H10-109188 A and JP H10-128573 A, they focus on the slump property and generation of solder balls so as to address adverse effects caused by preventing the increase in viscosity and improving the printing performances and the storage stability, and taking this into consideration, the PEG content is determined.

However, as described in JP H05-228690 A, JP H10-109188 A and JP H10-128573 A, it seems that increasing a content of a thixotropic agent can reduce the slump property and prevent generation of solder balls, but when a melting time for reflow is extended in order to reduce generation of voids, a peak temperature rises. As a result, the thixotropic agent is burned and cleaning is difficult. Void generation in the solder joint is necessary to be prevented, but in these patent literatures, no consideration is given to reduction in generation rate of voids.

Even if burning occurs, it can be cleaned by using a cleaning liquid having high detergency such as a fluorocarbon-based cleaning liquid, but such a cleaning liquid impose a large burden on the environment and thus use thereof should be avoided. Further, in the inventions described in JP H05-228690 A, JP H10-109188 A and JP H10-128573 A, when the content of the thixotropic agent is restricted to prevent burning, there is a concern that the solder powder and the flux may be separated from each other due to decrease in thixotropic property and decrease in viscosity.

As described above, in the solder paste in the related art, it is difficult to solve all of the problems of the separation between the solder powder and the flux, the environmental burden during cleaning, and generation of voids, so further studies are required.

An object of the present invention is to provide a flux and a solder paste, which can be easily cleaned with an environmentally friendly cleaning liquid, hardly suffer from separation between the flux and a powder, and contribute to prevention of generation of voids.

SUMMARY OF THE INVENTION

Solution to Problem

The present inventors focused on a causative substance of cleaning residues so that the residues can be easily removed with a cleaning liquid which imposes a small burden on the environment even if a sufficient melting time is ensured and generation of voids is reduced. The causative substance of cleaning residues is generated by burning of the thixotropic agent as described above. Therefore, the present inventors conceived of intentionally reducing the content of the thixotropic agent, unlike the flux in the related art. However, even if the content of the thixotropic agent is reduced, the thixotropic agent is still burned, and therefore, when a cleaning liquid which imposes a small burden on the environment and has low detergency is used, the residues still remain. Further, it is necessary to avoid the separation between the solder powder and the flux due to the decrease in viscosity of the solder paste.

Therefore, they made diligent studies so that all of the reduction in generation rate of voids, the detergency, and the prevention of the separation between the solder powder and the flux can be achieved. In addition to reducing the content of the thixotropic agent, the increase in content of the PEG, which was avoided in the related art in order to prevent the decrease in slump property and the generation of solder balls, was intentionally made. As a result, the PEG is not decomposed even if the peak temperature during heating rises due to a longer heating time, and a liquid state of the PEG is maintained. Therefore, by preventing the burning of the thixotropic agent, the residues can be easily removed with a cleaning liquid which imposes a small burden on the environment, such as a water-based cleaning liquid or a quasi-water-based cleaning liquid. Along with this, the heating time can be ensured such that the generation rate of voids is reduced. Further, it was found that the separation between the solder powder and the flux is prevented since the content of the PEG is higher than that in the related art, and thus the present invention was completed.

The present invention achieved based on these findings is as follows.

(1) A flux comprising a rosin, an activator, a solvent, and a thixotropic agent containing a polyethylene glycol, wherein a content of the polyethylene glycol is 10 mass % to 20 mass % with respect to a total mass of the flux, and a content of the thixotropic agent excluding the polyethylene glycol is 5 mass % or less with respect to the total mass of the flux.

(2) The flux according to the above (1), wherein the polyethylene glycol is solid at room temperature.

(3) A solder paste comprising the flux according to the above (1) or (2) and a solder powder.

DETAILED DESCRIPTION OF THE INVENTION

The present invention is described in more detail below. In the present description, "%" refers to "mass %" unless otherwise specified. Each component constituting the flux in the present invention is described in detail.

1. Rosin

The flux in the present invention contains a rosin. By containing the rosin, metal oxides can be removed. Examples of the rosin used in the present invention include those exemplified below. Examples thereof include raw material rosins such as a gum rosin, a wood rosin and a tall oil rosin, and derivatives obtained from these raw material rosins. Examples of the derivatives include purified rosins; hydrogenated rosins; disproportionated rosins; polymerized rosins; α, β-unsaturated carboxylic acid modified products (acrylic rosins, maleated rosins, fumarated rosins, and the like); purified products, hydrides, and disproportionated products of the polymerized rosins; and purified products, hydrides, and disproportionated products of the α, β-unsaturated carboxylic acid modified products. Among these, two or more kinds thereof may be contained. As the rosin used in the present invention, the polymerized rosin is preferable due to its high heat resistance and good detergency for flux.

A content of the rosin is preferably 15% to 50% with respect to a total mass of the flux. The content of the rosin is more preferably more than 15%, still more preferably 20% or more, and particularly preferably 25% or more, with respect to the total mass of the flux. The content of the rosin is more preferably less than 50%, still more preferably 48% or less, and particularly preferably 46% or less, with respect to the total mass of the flux.

The rosin is a very effective material in terms of preventing reoxidation of powders during reflow (during heating), is widely used as a flux material for soldering, and improves a basic mounting characteristic. However, from the viewpoint of detergency, for example, when a cleaning liquid having poor solubility in a rosin that remains as a flux residue is used, cleaning may be poor. In the present invention, deterioration of the detergency due to addition of the rosin is eliminated by adding the polyethylene glycol, so that the rosin can be contained in the above range.

2. Activator

The flux in the present invention contains an activator for removing metal oxides. Examples of the activator used in the present invention include organic acids, organic halogen compounds, and amine hydrohalides, and the organic acids are preferable.

Examples of the organic acids include malonic acid, succinic acid, glutaric acid, adipic acid, maleic acid, phthalic acid, pimelic acid, suberic acid, azelaic acid, sebacic acid, dimer acid, propionic acid, 2,2-bishydroxymethylpropionic acid, tartaric acid, malic acid, glycolic acid, diglycolic acid, thioglycolic acid, dithioglycolic acid, stearic acid, 12-hydroxystearic acid, palmitic acid, and oleic acid. Preferred examples thereof include malonic acid, succinic acid, glutaric acid, adipic acid, azelaic acid, and sebacic acid, and more preferred examples thereof include adipic acid and 2,2-bishydroxymethylpropionic acid. Among these, two or more kinds thereof may be contained.

Examples of the organic halogen compounds include trans-2,3-dibromo-1,4-butenediol, triallyl isocyanurate 6 bromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, and 2,3-dibromo-2-butene-1,4-diol.

Amine hydrohalide is a compound obtained by reaction of an amine with hydrogen halide. Examples of the amine of the amine hydrohalide include ethylamine, ethylenediamine, triethylamine, methylimidazole, 2-ethyl-4-methylimidazole, diphenylguanidine, and ditolylguanidine. Examples of the hydrogen halide include halides of chlorine, halides of bromine, halides of iodine, and hydrides of fluorine (hydrogen chloride, hydrogen bromide, hydrogen iodide, and hydrogen fluoride).

A content of the activator is preferably 1% to 10% with respect to the total mass of the flux. The content of the activator is more preferably 1.5% or more, still more preferably 2.0% or more, and particularly preferably 2.5% or more, with respect to the total mass of the flux. The content of the activator is more preferably 8% or less, still more preferably 6% or less, and particularly preferably 4% or less, with respect to the total mass of the flux.

3. Solvent

The flux in the present invention contains a solvent in which the rosin and the like are dissolved and dispersed uniformly. Examples of the solvent used in the present invention include those exemplified below. Examples thereof include alcohol-based solvents, ester-based solvents, glycol ether-based solvents, and terpineols, and the glycol ether-based solvents are preferable.

Examples of the ester-based solvents include diisobutyl succinate, dibutyl succinate, dimethyl adipate, diethyl adipate, dibutyl adipate, diisopropyl adipate, diisobutyl adipate, diisodecyl adipate, dibutyl maleate, dimethyl sebacate, diethyl sebacate, dibutyl sebacate, dioctyl sebacate, and diisopropyl sebacate.

Examples of the alcohol-based solvents include isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexanedimethanol, erythritol, threitol, guaiacol glycerol ether, 3,6-dimethyl-4-octyne-3,6-diol, and 2,4,7,9-tetramethyl-5-decyne-4,7-diol.

Examples of the glycol ether-based solvents include diethylene glycol mono-2-ethylhexyl ether, ethylene glycol monophenyl ether, 2-methylpentane-2,4-diol, diethylene glycol monohexyl ether, diethylene glycol dibutyl ether, triethylene glycol monobutyl ether, 1,3-butylene glycol, phenyl glycol, and hexylene glycol, and preferable examples thereof include diethylene glycol monohexyl ether and diethylene glycol mono-2-ethylhexyl ether. Among these, two or more kinds thereof may be contained.

A content of the solvent is preferably 20% to 75% with respect to the total mass of the flux. The content of the solvent is more preferably 25% or more, still more preferably 30% or more, and particularly preferably 35% or more, with respect to the total mass of the flux. The content of the solvent is more preferably 72% or less, still more preferably 70% or less, and particularly preferably 50% or less, with respect to the total mass of the flux.

4. Thixotropic Agent Containing Polyethylene Glycol

The flux in the present invention contains a thixotropic agent containing a PEG.

As for a molecular weight of the PEG contained in the thixotropic agent, the molecular weight of the PEG is desirably low for a water-based cleaning liquid from the viewpoint of detergency. However, in a case where the molecular weight of the PEG is low, the PEG is often in a state of liquid, and there is a concern that viscosity adjustment or heating slump property of a solder paste may deteriorate. Considering the above, an optimal molecular weight thereof is preferably 2700 to 3400. However, PEGs having different molecular weights may be used in combination or the concerned properties may be compensated by other flux materials, and thus those having a molecular weight of from 250 to 9000 can also be used in appropriate combinations.

The PEG is preferably liquid in a temperature range of 240° C. or higher.

From the viewpoint of preventing generation of voids and improving the detergency, a boiling point of the PEG is preferably 200° C. or higher, more preferably 230° C. or higher, and even more preferably 250° C. or higher.

If the PEG volatilizes during reflow, it leads to the generation of voids, and the case where a large amount of the PEG remains as a flux residue is advantageous from the viewpoint of the detergency. Therefore, it is preferable that the boiling point is high. The boiling point is preferably 300° C. or higher. Since such a PEG has a high boiling point, a liquid state thereof can be maintained at a temperature at which a solder alloy called high melting point solder melts.

When the liquid state is maintained during heating, the liquid PEG is flowing, so that adhesion of burning caused by the thixotropic agent is prevented, and the residue can be easily cleaned even with a cleaning liquid that imposes a small burden on the environment and has low detergency. Since the PEG has a thixotropic property, it is an alternative to the thixotropic agent that causes burning. Since the content of the thixotropic agent can be reduced, an adhesion amount of burning can be reduced, and the residue can be easily cleaned with the above-mentioned cleaning liquid. Further, even when a peak temperature during heating rises due to a long heating time, the residue can also be easily cleaned, and as a result, a generation rate of voids can be reduced. In a case of using a PEG that is solid at room temperature, since fluidity of a solder paste at room temperature can be adjusted in the same manner as the thixotropic agent, it is possible to prevent separation between a solder powder and the flux.

In order to exert such an effect, the solder paste in the present invention contains 10% to 20% of the PEG with respect to a mass of the flux.

In a case where a content of the PEG is less than 10%, the above effect cannot be exhibited. However, in a case where the content of the PEG is more than 20%, the amount of the rosin that can be contained is restricted in order to obtain a viscosity suitable for use. As a result, reflowability is lowered and generation of voids cannot be prevented. Since the PEG is hydrophilic, the detergency may be inferior in a case where a quasi-water-based cleaning liquid suitable for cleaning a rosin-based flux is used. The content of the PEG is preferably 10% to 16%, and more preferably 12% to 16%.

The PEG used in the present invention imparts a sufficient thixotropic property to the solder paste and increases the viscosity of the solder paste to prevent the separation between the flux and the solder powder that may occur during storage. Therefore, the PEG is preferably solid at room temperature.

The solder paste in the present invention may contain other thixotropic agents than the PEG. Examples thereof include wax-based thixotropic agents and amide-based thixotropic agents, and the wax-based thixotropic agents is preferred.

Examples of the wax-based thixotropic agents include hydrogenated castor oil.

Examples of the amide-based thixotropic agents include lauric acid amide, palmitic acid amide, stearic acid amide, behenic acid amide, hydroxystearic acid amide, oleic acid amide, erucic acid amide, methylene bisstearic acid amide, ethylene bislauric acid amide, ethylene bisstearic acid amide, ethylene bishydroxystearic acid amide, and methylolstearic acid amide. Among these, two or more kinds thereof may be contained.

A content of the thixotropic agents other than the PEG needs to be 5% or less with respect to the total mass of the flux, and is preferably 3% or less, and the thixotropic agents other than the PEG may not be contained.

5. Other Components

The flux in the present invention may contain amines, an antioxidant, or a defoamer.

Examples of the amines include aliphatic amines, amino alcohols, and imidazoles.

Examples of the aliphatic amines include dimethylamine, ethylamine, 1-aminopropane, isopropylamine, trimethylamine, n-butylamine, diethylamine, sec-butylamine, tert-butylamine, N,N-dimethylethylamine, isobutylamine, and cyclohexylamine.

Examples of the amino alcohols include 2-aminoethanol, 2-(ethylamino)ethanol, diisopropanolamine, triethanolamine, N-butyldiethanolamine, triisopropanolamine, N,N-bis(2-hydroxyethyl)-N-cyclohexylamine, N,N,N',N'- tetrakis(2-hydroxypropyl)ethylenediamine, and N,N,N',N'',N''-pentakis(2-hydroxypropyl)diethylenetriamine.

Examples of the imidazoles include 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 2-methyl imidazoline, 2-phenyl imidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentyl benzimidazole, 2-(1-ethylpentyl)benzimidazole, 2-nonylbenzimidazole, 2-(4-thiazolyl)benzimidazole, and benzimidazole.

Examples of the antioxidant include a hindered phenolic antioxidant.

Examples of the defoamer include acrylic polymers, vinyl ether polymers, butadiene polymers, and silicones.

6. Solder Paste

The solder paste in the present invention contains the above flux and a solder powder.

The solder powder is not particularly limited, and solder powders having various solder alloy compositions such as Sn-3Ag-0.5Cu-based solder alloy, Pb-10Sn-based solder alloy, and Sn—Sb-based solder alloy can be used. Since the solder paste in the present invention uses the above flux, even when a high melting point solder powder is used, it is possible to solve the problems that occur in a solder paste which is obtained by mixing the flux in the related art and a high melting point solder powder. Even if a melting point of the solder powder is 240° C. or higher, or 280° C. or higher, since a predetermined amount of the PEG is contained in the solder paste in the present invention, it is possible to prevent the poor cleaning due to burning, the separation between the solder powder and the flux, and the generation of voids.

A particle diameter of the solder powder is preferably 10 μm to 50 μm. A content of the solder powder is preferably 85% to 92% with respect to a total mass of the solder paste.

The solder paste in the present invention is produced by a method common in this art. For production of the solder powder, common methods, such as a dropping method in which heated molten solder is dropped to obtain particles, a spraying method in which centrifugal spraying is performed, and a method of crushing a bulk solder material, can be used. In the dropping method and the spraying method, the dropping and spraying are preferably performed in an inert atmosphere or in a solvent in order to form particles. Then, each component is heated and mixed to prepare a flux, and the solder powder is introduced into the flux, followed by stirring and mixing to produce a solder paste.

EXAMPLES

The present invention is described with reference to the following Examples, but the present invention is not limited to the following Examples. In Examples, "%" refers to "mass %" unless otherwise specified. The number indicated in the alloy composition of the solder powder means a content in mass %.

A solder powder having an alloy composition of Sn-3Ag-0.5Cu (Ag: 3 mass %, Cu: 0.5 mass %, balance: Sn and impurities, and melting point: 220° C.) and having a particle diameter of 20 μm to 38 μm, and a solder powder having an alloy composition of Pb-10Sn (Sn: 10 mass %, balance: Pb and impurities, and melting point: 302° C.) and having a particle diameter of 20 μm to 38 μm were prepared. Fluxes prepared as shown in Tables 1 and 3 and the solder powders were mixed to prepare solder pastes. Numerical values shown in Tables 1 and 3 refer to "mass %".

The alloy composition of the solder powder used in Examples 1 to 7 and Comparative Examples 1 to 4 shown in Table 1 is Sn-3Ag-0.5Cu. The alloy composition of the solder powder used in Examples 8 to 14 and Comparative Examples 5 to 8 shown in Table 3 is Pb-10Sn.

A mass ratio of the flux to the solder powder was set as follows: flux:solder powder=12:88 in the case of using the Sn-3Ag-0.5Cu solder powder; and flux:solder powder=9:91 in the case of using the Pb-10Sn solder powder.

For each solder paste, "1. Detergency", "2. Separation between flux and solder powder (Separation)", and "3. Voids (presence or absence of voids)" were evaluated. Details are as follows.

1. Detergency

1) Printing

The solder paste prepared as described above was printed on a Cu plate having a size of 50 mm×50 mm using a metal mask having an opening size of 5 mm×5 mm and a thickness of 0.4 mm.

2) Reflow Conditions

Case of Sn-3Ag-0.5Cu

The solder paste was held under a preheat temperature of 150° C. to 180° C. for 200 seconds, and was heated under the conditions that the rising rate from the preheat temperature to a peak temperature of 250° C. was 1.34° C./sec, a heating time at 220° C. or higher was 250 seconds, and an oxygen concentration was 2000 ppm, and then the solder paste was cooled to room temperature.

Case of Pb-10Sn

The solder paste was heated under the conditions that the rising rate from room temperature to a peak temperature of 380° C. was 4° C./sec, a heating time at 302° C. or higher was 50 seconds, and an oxygen concentration was 100 ppm or lower, and then the solder paste was cooled to room temperature.

3) Cleaning Conditions

Case of Water-Based Cleaning Liquid

A cleaning agent having a trade name of "VIGON A200" (manufactured by Zestron) was used and diluted with an ion-exchange water (cleaning agent:ion-exchange water=30:70 (mass ratio)) to obtain a cleaning liquid. Then, cleaning was performed by the following procedure.

(1) Ultrasonic cleaning in an ultrasonic bath filled with the cleaning liquid (50° C. and 10 minutes)
(2) Rinsing in an ultrasonic bath filled with ion-exchange water (room temperature, and 3 minutes for twice)
(3) Drying for 10 minutes in a constant temperature bath of 50° C.

Case of Quasi-Water-Based Cleaning Liquid

Cleaning was performed by the following procedure using a cleaning liquid having a trade name of "CLEAN-THROUGH 750J" (manufactured by Kao Corporation).

(1) Ultrasonic cleaning in an ultrasonic bath filled with the cleaning liquid (40° C. and 10 minutes)
(2) Rinsing in an ultrasonic bath filled with ion-exchange water (room temperature, and 3 minutes)
(3) Drying for 10 minutes in a constant temperature bath of 50° C.

4) Evaluation

A dried test piece was observed with a scanning electron microscope (SEM). When no cleaning residues were observed, it was evaluated as "○", and when cleaning residues were observed, it was evaluated as "x".

2. Separation

The paste was left to stand at room temperature for 3 days, and after allowing to stand, a surface condition of the paste was visually observed. When no separation was observed, it was evaluated as "○", and when separation was observed (flux embossment due to separation was observed), it was evaluated as "x".

3. Voids (Presence or Absence of Voids)

1) Printing

The solder paste prepared as described above was printed on a Cu plate having a size of 50 mm×50 mm using a metal mask having an opening size of 5 mm×5 mm and a thickness of 0.4 mm.

2) Reflow Conditions

Case of Sn-3Ag-0.5Cu

The solder paste was held under a preheat temperature of 150° C. to 180° C. for 200 seconds, and was heated under the conditions that the rising rate from the preheat temperature to a peak temperature of 250° C. was 1.34° C./sec, a heating time at 220° C. or higher was 250 seconds, and an oxygen concentration was 2000 ppm, and then the solder paste was cooled to room temperature.

Case of Pb-10Sn

The solder paste was heated under the conditions that the rising rate from room temperature to a peak temperature of 380° C. was 4° C./sec, a heating time at 302° C. or higher was 50 seconds, and an oxygen concentration was 100 ppm or lower, and then the solder paste was cooled to room temperature.

3) Void Observation

A transmission image of a soldered portion after reflow was observed using Microfocus X-ray System XVR-160 manufactured by UNi-HiTE SYSTEM, and the generation rate of voids was determined.

As for the generation rate of voids, transmission observation of the 3 mm soldered portion along a direction perpendicular to the surface of the Cu plate was performed and the transmission image of the solder joint was obtained. Then, a void area ratio was calculated by automatic analysis through identification of a portion filled with metal and a void portion (portion not filled with metal) based on a contrast of color tones of the transmission image, and the void area ratio was defined as the generation rate of voids.

4) Evaluation Criteria

When the generation rate of voids is more than 3%, it was evaluated as "x", when the generation rate of voids is more than 1% and 3% or less, it was evaluated as "○", and when the generation rate of voids is 1% or less, it was evaluated as "○○".

Evaluation results are shown in Tables 2 and 4.

TABLE 1

| Solder powder composition (number indicating mass %) | Flux component | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|
| Sn—3Ag—0.5Cu | Polymerized rosin (mass %) | 35 | 35 | 50 | 35 | 35 | 35 | 10 | 40 | 35 | 0 | 15 |
| | Diethylene glycol monohexyl ether (mass %) | 52 | 50 | 35 | 50 | 44 | 41 | 72 | 52 | 52 | 67 | 61 |
| | PEG-4000S (mass %) | 10 | 10 | 10 | 12 | 16 | 20 | 10 | 0 | 8 | 25 | 15 |
| | Adipic acid (mass %) | 3 | 3 | 3 | 3 | 3 | 3 | 3 | 3 | 3 | 3 | 3 |
| | Hydrogenated castor oil (mass %) | 0 | 2 | 2 | 0 | 2 | 1 | 5 | 5 | 2 | 5 | 6 |
| | Total amount (mass %) | 100 | 100 | 100 | 100 | 100 | 100 | 100 | 100 | 100 | 100 | 100 |

Underlined value indicates that the value is out of the scope of the present invention.

TABLE 2

| | Evaluation Items | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|
| Detergency | Quasi-water-based cleaning liquid | ○ | ○ | ○ | ○ | ○ | ○ | ○ | ○ | ○ | x | x |
| | Water-based cleaning liquid | ○ | ○ | ○ | ○ | ○ | ○ | ○ | x | x | ○ | x |
| | Separation | ○ | ○ | ○ | ○ | ○ | ○ | ○ | ○ | x | ○ | ○ |
| | Void | ○○ | ○○ | ○○ | ○○ | ○○ | ○○ | ○ | ○ | ○ | x | ○ |

TABLE 3

| Solder powder composition (number indicating mass %) | Flux component | Ex. 8 | Ex. 9 | Ex. 10 | Ex. 11 | Ex. 12 | Ex. 13 | Ex. 14 | Comp. Ex. 5 | Comp. Ex. 6 | Comp. Ex. 7 | Comp. Ex. 8 |
|---|---|---|---|---|---|---|---|---|---|---|---|---|
| Pb—10Sn | Polymerized rosin (mass %) | 35 | 35 | 50 | 35 | 35 | 35 | 10 | 40 | 35 | 0 | 15 |
| | Diethylene glycol monohexyl ether (mass %) | 52 | 50 | 35 | 50 | 44 | 41 | 72 | 52 | 52 | 67 | 61 |
| | PEG-4000S (mass %) | 10 | 10 | 10 | 12 | 16 | 20 | 10 | <u>0</u> | <u>8</u> | <u>25</u> | 15 |
| | Adipic acid (mass %) | 3 | 3 | 3 | 3 | 3 | 3 | 3 | 3 | 3 | 3 | 3 |
| | Hydrogenated castor oil (mass %) | 0 | 2 | 2 | 0 | 2 | 1 | 5 | 5 | 2 | 5 | <u>6</u> |
| | Total amount (mass %) | 100 | 100 | 100 | 100 | 100 | 100 | 100 | 100 | 100 | 100 | 100 |

Underlined value indicates that the value is out of the scope of the present invention.

TABLE 4

| Evaluation Items | | Ex. 8 | Ex. 9 | Ex. 10 | Ex. 11 | Ex. 12 | Ex. 13 | Ex. 14 | Comp. Ex. 5 | Comp. Ex. 6 | Comp. Ex. 7 | Comp. Ex. 8 |
|---|---|---|---|---|---|---|---|---|---|---|---|---|
| Detergency | Quasi-water-based cleaning liquid | ○ | ○ | ○ | ○ | ○ | ○ | ○ | ○ | ○ | x | x |
| | Water-based cleaning liquid | ○ | ○ | ○ | ○ | ○ | ○ | ○ | x | x | ○ | x |
| | Separation | ○ | ○ | ○ | ○ | ○ | ○ | ○ | ○ | x | ○ | ○ |
| | Void | ○○ | ○○ | ○○ | ○○ | ○○ | ○○ | ○ | ○ | ○ | x | ○ |

As shown in Tables 2 and 4, it was found that all of the solder pastes in Examples satisfy the requirements of the present invention, and were excellent in detergency, and were prevented from occurrence of the separation and generation of voids.

In contrast, since the solder pastes in Comparative Examples 1, 2, 5, and 6 did not contain a PEG or contained a small amount of the PEG, residues were observed in the case of using the water-based cleaning liquid having higher hydrophilicity than the quasi-water-based cleaning liquid. In the solder pastes in Comparative Examples 3 and 7, since a content of the rosin was restricted due to a high content of the PEG, so that the reflowability was lowered and the generation rate of voids was high. Since the PEG is hydrophilic, it was found that the solder pastes in Comparative Examples 3 and 7 were inferior in detergency in the case of using the quasi-water-based cleaning liquid.

Since the solder pastes in Comparative Examples 4 and 8 contained a large amount of thixotropic agents other than the PEG, burning occurred and the detergency thereof was deteriorated in any of the cleaning liquids.

INDUSTRIAL APPLICABILITY

The present invention can provide a flux and a solder paste, which can be easily cleaned with an environmentally friendly cleaning liquid, hardly suffer from separation between the flux and a powder, and contribute to prevention of generation of voids.

Although the present invention is described in detail with reference to specific embodiments, it will be apparent to those skilled in the art that various changes and modifications can be made without departing from the spirit and scope of the present invention.

This application is based on Japanese Patent Application No. 2019-183500 filed on Oct. 4, 2019, the contents of which are incorporated herein by reference.

The invention claimed is:

1. A solder paste, comprising:
a solder powder; and
a flux comprising a rosin, an activator, a solvent and a thixotropic agent containing a polyethylene glycol, wherein
the solder powder has a melting point of 280° C. or higher,
a content of the polyethylene glycol is 10 mass % to 20 mass % with respect to a total mass of the flux,
a content of the thixotropic agent excluding the polyethylene glycol is 5 mass % or less with respect to the total mass of the flux,
a content of the rosin is 35 mass % or more and 50 mass % or less with respect to the total mass of the flux,
a content of the solvent is 35 mass % or more with respect to the total mass of the flux,
the solvent consists of at least one component selected from the group consisting of an alcohol-based solvent, an ester-based solvent, a glycol ether-based solvent, and a terpineol,
the alcohol-based solvent is selected from the group consisting of isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl) ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl] ether, 1-ethynyl-1-cyclohexanol, 1,4-cyclohexanediol, 1,4-cyclohexanedimethanol, erythritol, threitol, guaiacol glycerol ether, 3,6-dimethyl-4-octyne-3,6-diol, and 2,4,7,9-tetramethyl-5-decyne-4,7-diol, the ester-based solvent is selected from the group consisting of diisobutyl succinate, dibutyl succinate, dimethyl adipate, diethyl adipate, dibutyl adipate, diisopropyl adipate, diisobutyl adipate, diisodecyl adipate, dibutyl maleate, dimethyl sebacate, diethyl sebacate, dibutyl sebacate, dioctyl sebacate, and diisopropyl sebacate, and the glycol ether-based solvent is selected from the group consisting of diethylene glycol mono-2-ethylhexyl ether, ethylene glycol monophenyl ether, 2-methylpentane-2,4-diol, diethylene glycol monohexyl ether, diethylene glycol dibutyl ether, triethylene glycol monobutyl ether, 1,3-butylene glycol, phenyl glycol, and hexylene glycol, and the rosin comprises one or more components selected from the group consisting of:
  a gum rosin, a wood rosin, a tall oil rosin,
  a purified gum rosin, a purified wood rosin, a purified tall oil rosin,
  a hydrogenated gum rosin, a hydrogenated wood rosin, a hydrogenated tall oil rosin,
  a disproportionated gum rosin, a disproportionated wood rosin, a disproportionated tall oil rosin,
  a polymerized gum rosin, a polymerized wood rosin, a polymerized tall oil rosin,
  an acrylic gum rosin, an acrylic wood rosin, an acrylic tall oil rosin,
  a maleated gum rosin, a maleated wood rosin, a maleated tall oil rosin,
  a fumarated gum rosin, a fumarated wood rosin, a fumarated tall oil rosin,
  a purified product of the polymerized gum rosin, a purified product of the polymerized wood rosin, a purified product of the polymerized tall oil rosin,
  a hydride of the polymerized gum rosin, a hydride of the polymerized wood rosin, a hydride of the polymerized tall oil rosin,
  a disproportionated product of the polymerized gum rosin, a disproportionated product of the polymerized wood rosin, a disproportionated product of the polymerized tall oil rosin,
  a purified product of the acrylic gum rosin, a purified product of the acrylic wood rosin, a purified product of the acrylic tall oil rosin,
  a hydride of the acrylic gum rosin, a hydride of the acrylic wood rosin, a hydride of the acrylic tall oil rosin,
  a disproportionated product of the acrylic gum rosin, a disproportionated product of the acrylic wood rosin, a disproportionated product of the acrylic tall oil rosin,
  a purified product of the maleated gum rosin, a purified product of the maleated wood rosin, a purified product of the maleated tall oil rosin,
  a hydride of the maleated gum rosin, a hydride of the maleated wood rosin, a hydride of the maleated tall oil rosin,
  a disproportionated product of the maleated gum rosin, a disproportionated product of the maleated wood rosin, a disproportionated product of the maleated tall oil rosin,
  a purified product of the fumarated gum rosin, a purified product of the fumarated wood rosin, a purified product of the fumarated tall oil rosin,
  a hydride of the fumarated gum rosin, a hydride of the fumarated wood rosin, a hydride of the fumarated tall oil rosin, and
  a disproportionated product of the fumarated gum rosin, a disproportionated product of the fumarated wood rosin, and a disproportionated product of the fumarated tall oil rosin.

2. The solder paste according to claim 1, wherein the polyethylene glycol is solid at room temperature.

3. The solder paste according to claim 1, wherein the rosin comprises two or more selected from the group consisting of:
  a gum rosin, a wood rosin, a tall oil rosin,
  a purified gum rosin, a purified wood rosin, a purified tall oil rosin,
  a hydrogenated gum rosin, a hydrogenated wood rosin, a hydrogenated tall oil rosin,
  a disproportionated gum rosin, a disproportionated wood rosin, a disproportionated tall oil rosin,
  a polymerized gum rosin, a polymerized wood rosin, a polymerized tall oil rosin,
  an acrylic gum rosin, an acrylic wood rosin, an acrylic tall oil rosin,
  a maleated gum rosin, a maleated wood rosin, a maleated tall oil rosin,
  a fumarated gum rosin, a fumarated wood rosin, a fumarated tall oil rosin,
  a purified product of the polymerized gum rosin, a purified product of the polymerized wood rosin, a purified product of the polymerized tall oil rosin,
  a hydride of the polymerized gum rosin, a hydride of the polymerized wood rosin, a hydride of the polymerized tall oil rosin,
  a disproportionated product of the polymerized gum rosin, a disproportionated product of the polymerized wood rosin, a disproportionated product of the polymerized tall oil rosin,
  a purified product of the acrylic gum rosin, a purified product of the acrylic wood rosin, a purified product of the acrylic tall oil rosin,
  a hydride of the acrylic gum rosin, a hydride of the acrylic wood rosin, a hydride of the acrylic tall oil rosin,
  a disproportionated product of the acrylic gum rosin, a disproportionated product of the acrylic wood rosin, a disproportionated product of the acrylic tall oil rosin,
  a purified product of the maleated gum rosin, a purified product of the maleated wood rosin, a purified product of the maleated tall oil rosin,
  a hydride of the maleated gum rosin, a hydride of the maleated wood rosin, a hydride of the maleated tall oil rosin,
  a disproportionated product of the maleated gum rosin, a disproportionated product of the maleated wood rosin, a disproportionated product of the maleated tall oil rosin, a purified product of the fumarated gum rosin, a purified product of the fumarated wood rosin, a purified product of the fumarated tall oil rosin, a hydride of the fumarated gum rosin, a hydride of the fumarated wood rosin, a hydride of the fumarated tall oil rosin, and a disproportionated product of the fumarated gum rosin, a disproportionated product of the fumarated wood rosin, and a disproportionated product of the fumarated tall oil rosin.

4. The solder paste according to claim 1, wherein the polyethylene glycol is liquid in a temperature range of 240° C. or higher.

5. The solder paste according to claim 1, wherein the polyethylene glycol has a boiling point of 300° C. or higher.

6. The solder paste according to claim 1, wherein the polyethylene glycol has a molecular weight of 2700 to 3400.

7. The solder paste according to claim 1, wherein the content of the polyethylene glycol is 16 mass % to 20 mass % with respect to the total mass of the flux.

* * * * *